United States Patent [19]

Usuki

[11] Patent Number: 5,958,544
[45] Date of Patent: Sep. 28, 1999

[54] MAGNETIC RECORDING MEDIUM AND PROCESS FOR PRODUCING THE SAME

[75] Inventor: Kazuyuki Usuki, Kanagawa-ken, Japan

[73] Assignee: Fuji Photo Film Co., Ltd., Kanagawa-Ken, Japan

[21] Appl. No.: 08/815,925

[22] Filed: Mar. 13, 1997

[30] Foreign Application Priority Data

Mar. 15, 1996 [JP] Japan ..................................... 8-059130

[51] Int. Cl.$^6$ ....................................................... G11B 5/66
[52] U.S. Cl. .............. 428/65.3; 428/694 T; 428/694 TS; 428/694 SL; 428/900; 428/131; 427/127; 427/128; 427/129; 427/130
[58] Field of Search .......................... 428/694 T, 694 TS, 428/65.3, 900, 694 SL; 427/127, 128, 129, 130, 131

[56] References Cited

U.S. PATENT DOCUMENTS

| | | | |
|---|---|---|---|
| 5,277,980 | 1/1994 | Mino | 428/403 |
| 5,472,778 | 12/1995 | Ueda | 428/332 |
| 5,604,029 | 2/1997 | Maezawa | 428/327 |
| 5,626,943 | 5/1997 | Tenhover | 428/141 |

*Primary Examiner*—Leszek Kiliman
*Attorney, Agent, or Firm*—Sughrue, Mion, Zinn, Macpeak & Seas, PLLC

[57] ABSTRACT

A magnetic recording medium comprises a non-magnetic substrate and a magnetic layer, which is constituted of a thin ferromagnetic metal film and is overlaid upon at least either one of the surfaces of the non-magnetic substrate. A prime-coating layer, which has alkyl chains linked by an ether linkage to each other in a polysiloxane, is formed between the non-magnetic substrate and the thin ferromagnetic metal film. The magnetic recording medium is capable of being produced easily and at a low cost. The prime-coating layer has smooth surface characteristics, is free from deterioration of surface characteristics and the occurrence of cracking even during the formation of a magnetic layer thereon with a sputtering process, and causes no blocking to occur.

8 Claims, No Drawings

MAGNETIC RECORDING MEDIUM AND PROCESS FOR PRODUCING THE SAME

BACKGROUND OF THE INVENTION

1. Field of the Invention

This invention relates to a magnetic recording medium, which comprises a magnetic layer constituted of a thin ferromagnetic metal film, and a process for producing the magnetic recording medium.

2. Description of the Prior Art

Ordinarily, magnetic recording media, such as magnetic tapes, floppy disks, and hard disks, have heretofore been produced with processes for forming a magnetic layer, a protective layer, and the like, on a non-magnetic substrate. As such magnetic recording media, magnetic recording media provided with a thin ferromagnetic metal film, which is formed with a vacuum film forming process, such as a sputtering process or a vacuum evaporation process, as the magnetic layer have widely been used in practice. The magnetic recording media provided with the magnetic layer, which is formed with the sputtering process or the vacuum evaporation process, have characteristics such that a high level of magnetic energy can be obtained easily. Also, the magnetic layer having a high level of surface smoothness can be obtained easily by rendering the surface of the non-magnetic substrate smooth. Therefore, the spacing loss can be kept small, and good electromagnetic transducing characteristics can be obtained. Accordingly, the magnetic recording media provided with the magnetic layer, which is formed with the sputtering process or the vacuum evaporation process, are suitable as materials for recording magnetic information at high densities. In particular, the sputtering process is advantageous over the vacuum evaporation process in that the magnetic energy can be enhanced even further. Therefore, the sputtering process is employed for the production of magnetic recording media, such as hard disks, on which the magnetic information is to be recorded at high densities.

Magnetic recording media are required to have high reliability with respect to the sliding movement operation on magnetic heads. For example, the magnetic recording media are required to have a high durability against the movement operation, such as contact-start-and-stop (CSS) characteristics of hard disks or still durability of vapor deposition tapes. In order for the high durability to be obtained, small protrusions have heretofore been formed on the surface of the non-magnetic substrate such that the actual area of contact between the magnetic recording medium and the magnetic head may be reduced.

However, nowadays, there is a strong demand for magnetic recording media on which the magnetic information can be recorded at high densities, and electromagnetic transducing characteristics better than those in the past are required. Therefore, there is a tendency for the height of the protrusions, which are formed on the surface of the non-magnetic substrate, to be reduced. The height of the protrusions is thus set to be at most 20 nm.

Accordingly, in a process for producing a hard disk, the surface of a non-magnetic substrate, such as an aluminum substrate, a glass substrate, or a carbon substrate, is polished mechanically or chemically, and the non-magnetic substrate having a very smooth surface texture is thereby obtained. Also, in a process for producing a magnetic tape provided with a magnetic layer formed with the vacuum evaporation process, the surface of a polymer film serving as the non-magnetic substrate, such as a polyethylene terephthalate film or a polyethylene naphthalate film, is rendered very smooth, and spherical fine grains are applied onto the surface of the polymer film. Such that the magnetic information may be recorded at particularly high densities, the height of the protrusions must be reduced, or a specular substrate substantially free from any protrusion must be used.

As for the magnetic recording media, such as magnetic tapes or floppy disks, in which the flexible polymer film, such as a polyethylene terephthalate film or a polyethylene naphthalate film, is employed as the non-magnetic substrate, such that, for example, the recording density may be enhanced, the magnetic layer constituted of a thin ferromagnetic metal film should preferably be formed with the sputtering process or the vacuum evaporation process. However, the heat resistance of the polymer film is low. Therefore, in cases where the magnetic layer is formed on the polymer film with the sputtering process, or in cases where the magnetic layer is formed on the polymer film with the vacuum evaporation process at a high rate of vapor deposition, the problems occur in that the polymer film or its surface becomes heated and deteriorated due to separating of oligomers. As a result, it becomes difficult to obtain good surface smoothness of the non-magnetic substrate or the magnetic layer. In order to solve the problems, the techniques described below have been proposed.

In one of the proposed techniques, a heat-resistant resin is utilized as the material for the polymer film serving as the non-magnetic substrate. It may be considered that a polyimide resin, or the like, may be employed as the heat-resistant resin. However, in general, polyimide resin films are expensive. Also, for technical reasons, it is difficult to prepare and use polyimide films having very smooth surfaces and good surface characteristics. Therefore, the proposed technique is not suitable for use in practice.

In different proposed techniques, a prime-coating layer is formed on, for example, a comparatively cheap polymer film, which is ordinarily used for the conventional magnetic recording media provided with a magnetic layer formed with a coating process, and the surface smoothness and the heat resistance of the film is thereby enhanced.

For example, in Japanese Unexamined Patent Publication No. 6(1994)-349042, a method for preparing a film having an appropriate level of surface characteristics is disclosed, wherein a resin layer containing fine grains is formed on a polymer film having a comparatively rough surface. However, in cases where ordinary resin binders employed in the disclosed method are used, if a magnetic layer is formed on the film with the sputtering process, the surface characteristics will be deteriorated markedly due to thermal damage.

Also, a method, wherein a polyethylene naphthalate is coated on a polyethylene terephthalate, and wherein the separating of oligomers due to heat is thereby restricted, is disclosed in, for example, Japanese Unexamined Patent Publication No. 7(1995)-225934. However, with the disclosed method wherein a polyethylene naphthalate is utilized, if the film is heated to a temperature of 200° C., which is ordinarily set in the sputtering process, the surface characteristics will be deteriorated due to the separating of oligomers.

Further, a method, wherein a polyamide resin or a polyimide resin having a high heat resistance is coated onto a polymer film, is disclosed in, for example, Japanese Unexamined Patent Publication No. 6(1994)-208717. In cases where such a material is used, a heat resistance capable of overcoming the temperature conditions in the sputtering process can be imparted to the polymer film. However, the polyamide resins and the polyimide resins have a low solubility in general-purpose solvents, and therefore solvents, which are difficult to process, must be used for such resins. Even if the resins were soluble in general-purpose solvents, since the viscosity of the solutions is high, a thin and uniform coating layer cannot be obtained, and it would be difficult to enhance the surface characteristics of the polymer film. Also, with the disclosed method, it is difficult to dry the solvent sufficiently, and the amount of the solvent remaining in the coating layer cannot be kept small. Therefore, the blocking readily occurs, and thus the coating layer, which has been formed on the front surface of the polymer film, and the back surface of the polymer film adhere to each other when the polymer film is wound up. Further, there is the risk that, when the magnetic layer is formed on the coating layer in a vacuum tank, the residual solvent volatilizes from the coating layer and contaminates the region in the vacuum tank.

In order for a coating layer having a high heat resistance to be obtained, it is efficient to form a coating layer of an inorganic material. For example, it may be considered to form a layer of silica, which is obtained from hydrolysis of a silane compound, or a layer of a metal oxide, which is obtained from a metal alkoxide. However, such a layer of the inorganic material cannot follow a thermal change of the non-magnetic substrate. As a result, cracks occur on the surface of the layer of the inorganic material, and the magnetic layer formed on the layer of the inorganic material also becomes cracked.

As described above, in cases where the polymer film, or the like, is employed as the substrate, and the magnetic layer constituted of the thin ferromagnetic metal film is formed on the substrate with the sputtering process, or the like, it is desirable that a prime-coating layer, which has a high heat resistance and good surface smoothness and which is free from any crack and can be formed easily, is formed between the substrate and the magnetic layer. However, with the conventional techniques, it was difficult is to form a prime-coating layer which sufficiently satisfy these requirements.

SUMMARY OF THE INVENTION

The primary object of the present invention is to provide a magnetic recording medium, which is provided with a specific prime-coating layer on a substrate and is capable of being produced easily and at a low cost, the prime-coating layer having smooth surface characteristics, being free from deterioration of surface characteristics and the occurrence of cracking even during the formation of a magnetic layer thereon with a sputtering process, that is accompanied by heating of the substrate, and causing no blocking to occur.

Another object of the present invention is to provide a process for producing the magnetic recording medium.

The present invention provides a magnetic recording medium comprising a non-magnetic substrate and a magnetic layer, which is constituted of a thin ferromagnetic metal film and is overlaid upon at least either one of the surfaces of the non-magnetic substrate, wherein a prime-coating layer, which has alkyl chains linked by an ether linkage to each other in a polysiloxane, is formed between the non-magnetic substrate and the thin ferromagnetic metal film.

In the magnetic recording medium in accordance with the present invention, the prime-coating layer should preferably contain, as a principal constituent, a polymerization product of a silane coupling agent, which contains an organic residue having an epoxy group.

The present invention also provides a process for producing a magnetic recording medium, comprising the steps of:

i) applying a coating composition, which contains a solution of a silane coupling agent, that contains an organic residue having an epoxy group, onto a non-magnetic substrate, and ii) heating the applied coating composition such that the applied coating composition may be dried and such that the silane coupling agent may be polymerized, whereby a prime-coating layer is formed on the non-magnetic substrate.

In the process for producing a magnetic recording medium in accordance with the present invention, the coating composition may further contain a hardener. The hardener may be constituted of a metal chelate compound, or the like.

Also, in process for producing a magnetic recording medium in accordance with the present invention, the solution of the silane coupling agent, that contains the organic residue having an epoxy group, may further contain a silane coupling agent, which contains a hydrocarbon group.

In the magnetic recording medium in accordance with the present invention, the polymerization product layer constituted of the polymerization product of the silane coupling agent, which contains the silane coupling agent, that contains the organic residue having the epoxy group, is formed as the prime-coating layer on the non-magnetic substrate. The polymerization product layer comprises the siloxane bond and the bond, which is formed by the ring opening of the epoxy group. Therefore, the polymerization product layer has better smoothness, a higher heat resistance, and better anti-blocking characteristics than those of the conventional polyester resin, or the like. Also, the polymerization product layer has better anti-cracking characteristics than those of the silica film, which is formed with a sol-gel process by using tetraethoxysilane as the starting material.

DETAILED DESCRIPTION OF THE INVENTION

The silane coupling agent, which contains the organic residue having the epoxy group and is employed in the magnetic recording medium in accordance with the present invention, may be represented by Chemical Formula (1) shown below.

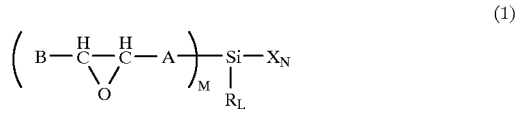

wherein A represents a bivalent organic residue, such as an alkylene group, B represents hydrogen or a monovalent organic residue, such as an alkyl group, R represents a monovalent organic residue, such as an alkyl group, X represents a monovalent group selected from the group consisting of an alkoxy group, a hydroxyl group, a halogen, and hydrogen, and L+M+N=4.

In Chemical Formula (1) shown above, A should preferably be hydrogen, and R should preferably be a monovalent organic residue, such as a methyl group or an ethyl group. From the view point of the reactivity and the level of corrosiveness with respect to the magnetic layer, X should preferably be an alkoxy group. Such that the polymerization reaction may be facilitated, X should more preferably be an alkoxy group having at most four carbon atoms, such as a methoxy group. Also, M should preferably be 1 or 2. Such that the polymerization reaction may be facilitated, M should more preferably be 1. L should preferably be 0 or 1. Such that the polymerization reaction may be facilitated, L should more preferably be 0. Therefore, N should particularly preferably be 3.

Examples of the silane coupling agent represented by Chemical Formula (1) include the compound represented by Chemical Formula (2) shown below, and the like.

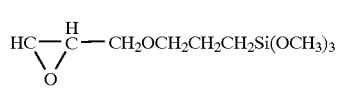

(2)

Such compounds are described in, for example, Japanese Unexamined Patent Publication Nos. 51(1976)-11871 and 63(1988)-23224.

When the coating composition, which contains the solution of the silane coupling agent, that contains the organic residue having the epoxy group, is applied onto the non-magnetic substrate and dried with the method, which will be described later, the alkoxysilane part, or the like, of the silane coupling agent undergoes hydrolysis and polymerization and forms the siloxane bond. Also, the epoxy group undergoes ring opening and polymerization due to heat. When necessary, the rate of the hydrolysis and the rate of the polymerization can be adjusted by the addition of an acid, such as hydrochloric acid.

In order to initiate the polymerization of the silane coupling agent at a low temperature, a hardener should preferably be utilized. Examples of the hardeners include various compounds, such as metal chelate compounds, organic acids and their salts, and perchlorates. From the view point of reduction in the hardening temperature and the level of corrosiveness with respect to the magnetic layer, metal chelate compounds should preferably be employed as the hardener. For example, in cases where aluminum acetylacetonate is added as the hardening catalyst to 3-glycidoxypropyltrimethoxysilane, hardening can be achieved by heating at a temperature of approximately 100° C. for a short period of time. Therefore, in such cases, hardening can be carried out even on a substrate having a low heat resistance, such as a polyethylene terephthalate. Accordingly, the prime-coating layer can be formed on the substrate with a continuous gravure coating process, and the substrate, on which the prime-coating layer has been formed, can be wound up such that no blocking may occur. As the hardener, chelate compounds of β-diketones and metals, such as aluminum acetylacetonate, zirconium acetylacetonate, and titanium acetylacetonate, are particularly preferable.

The silane coupling agent, which contains the organic residue having the epoxy group, is ordinarily expensive. In order to keep the cost low, a mixture of the silane coupling agent, which contains the organic residue having the epoxy group, and a silane coupling agent, which contains a hydrocarbon group, such as a methyl group, should preferably be used. In cases where the silane coupling agent, which contains the hydrocarbon group, is thus used together, the heat resistance of the prime-coating layer can be enhanced. The silane coupling agent, which contains the hydrocarbon group, may be represented by the chemical formula shown below.

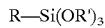

wherein each of R and R' represents a hydrocarbon group. In order for the characteristics of the prime-coating layer to be enhanced, the number of carbons of R should preferably be as small as possible.

When the prime-coating layer is to be formed by applying the silane coupling agent, which contains the organic residue having the epoxy group, onto the non-magnetic substrate, a solution containing the silane coupling agent, the hardener, and water in an organic solvent, such as methanol, may be applied onto the non-magnetic substrate with a coating technique, such as a wire bar coating process, a gravure coating process, a spray coating process, a dip coating process, or a spin coating process, and may then be dried. When necessary, the thus formed coating layer may then be treated with heat, and the hardening may thereby be promoted. In this manner, the heat resistance, the solvent resistance, and the adhesion properties of the coating layer can be enhanced.

The solvent used in the coating composition is determined in accordance with the structure of the silane coupling agent, which contains the organic residue having the epoxy group. By way of example, ethanol, methanol, or the like, may be used as the solvent. A mixed solvent obtained by mixing such a solvent and isopropyl alcohol, methyl ethyl ketone, or the like, may also be used.

The drying step is carried out in order to volatilize the solvent. The hardening may be carried out simultaneously with the drying step. The drying step may be carried out with an ordinary technique, such as hot-air drying or infrared drying. The drying temperature should preferably fall within the range of approximately 60° C. to approximately 150° C.

After the coating layer has been dried, it may be treated with heat such that the hardening may be promoted. As the heat treatment technique, hot-air heating, infrared heating, heated roller heating, or the like, maybe utilized. The heating temperature may be selected in accordance with the thickness of the coating layer, the method used for forming the magnetic layer, and the temperature at which the magnetic layer is formed. In cases where the thickness of the coating layer is approximately 1 μm, the heating temperature may fall within the range of 100° C. to 250° C., and should preferably fall within the range of 120° C. to 200° C. If the heating temperature is lower than 100° C., the polymerization reaction will not occur sufficiently. If the heating temperature is higher than 250° C., the non-magnetic substrate will be deformed, or the productivity cannot be kept high.

The polymerization may also be carried out by irradiation of ultraviolet rays, irradiation of an electron beam, or the like.

The prime-coating layer in the magnetic recording medium in accordance with the present invention may also contain constituents other than the silane coupling agent, which contains the organic residue having the epoxy group, and the hardener. Thus the prime-coating layer may also contain additives, such as heat-resistant fine grains (a filler) for forming protrusions on the surface of the prime-coating layer, a metal alkoxide for adjusting the heat resistance and the hardness of the coating layer, a coupling agent for improving the adhesion with the substrate, and a rust preventive agent for preventing the magnetic layer from being oxidized.

The heat-resistant fine grains for forming the protrusions on the surface of the prime-coating layer may be constituted of an inorganic oxide, such as silica, alumina, titania, or zirconia; calcium carbonate, carbon, a polymer, or the like. The heat-resistant fine grains should preferably be monodisperse, spherical grains. The grain diameter may be selected in accordance with the thickness of the prime-coating layer. The grain diameter may fall within the range of 10 nm to 1,000 nm, and should preferably fall within the range of 20 nm to 100 nm. The coating composition employed for forming the prime-coating layer primarily takes on the form of a solution in an alcohol. Therefore, the heat-resistant fine grains should preferably be used in the form of an organo-silica sol in an alcohol, a silica sol in an aqueous acid solution, or the like.

As the metal alkoxide for adjusting the heat resistance and the hardness of the coating layer, tetraethoxysilane, tetrapropoxyzirconium, or the like, may be employed. By the addition of the metal alkoxide, the heat resistance and the hardness of the coating layer can be enhanced.

In cases where the magnetic recording medium in accordance with the present invention takes on the form of a flexible medium, the non-magnetic substrate may be constituted of a film having a thickness falling within the range of 3 $\mu$m to 100 $\mu$m. The film may be constituted of a material, such as a polyethylene terephthalate, a polyethylene naphthalate, a polyimide, a polyamide, or a polyamide-imide. The film may contain a filler, and protrusions may be formed on the surface of the film. In cases where the magnetic recording medium in accordance with the present invention takes on the form of a rigid medium, the non-magnetic substrate may be constituted of a glass, aluminum, or carbon.

The prime-coating layer employed in the present invention has good adhesion properties with respect to the substrate. In cases where the adhesion properties are to be enhanced, the substrate may be subjected to surface treatment with an additive, such as a silane coupling agent, oxygen plasma treatment, argon plasma treatment, exposure to ultraviolet rays, exposure to an electron beam, flame treatment, or the like.

The thin ferromagnetic metal film serving as the magnetic layer of the magnetic recording medium in accordance with the present invention may be formed with the known vacuum evaporation process, the known sputtering process, or the like.

In cases where the magnetic layer is formed with the sputtering process, a composition, which contains known metals or alloys and is primarily constituted of cobalt, maybe employed as the composition, which is to be sputtered. Specifically, the composition, which is to be sputtered, may be constituted of Co—Cr, Co—Ni—Cr, Co—Cr—Ta, Co—Cr—Pt, Co—Cr—Ta—Pt, Co—Cr—Pt—Si, Co—Cr—Pt—B, or the like. In particular, such that the electromagnetic transducing characteristics may be enhanced, Co—Cr—Ta or Co—Cr—Pt should preferably be employed. The thickness of the magnetic layer should preferably fall within the range of 10 nm to 300 nm. Also, in such cases, a primary layer for improving the magneto-static characteristics of the magnetic layer should preferably be formed. As the composition for forming the primary layer, a composition containing known metals or alloys may be employed. For example, the composition for forming the primary layer may be constituted of Cr, V, Ti, Ta, W, Si, or an alloy of two or more of them. Among the above-enumerated materials, Cr, Cr—Ti, Cr—V, and Cr—Si are particularly preferable. The thickness of the primary layer may fall within the range of 5 nm to 500 nm, and should preferably fall within the range of 10 nm to 200 nm.

In cases where the magnetic layer is formed with the sputtering process, the formation of the magnetic layer should preferably be carried out while the substrate or the film is being heated. The temperature, at which the substrate or the film is heated, may fall within the range of approximately 150° C. to approximately 200° C.

In cases where the magnetic layer is formed with the vacuum evaporation process, a composition, which contains known metals or alloys and is primarily constituted of cobalt, may be employed as the composition which is to be evaporated. Specifically, Co, Co—Ni, Co—Fe, or the like, is subjected to vacuum evaporation in an oxygen atmosphere, and the magnetic layer containing oxygen is thereby formed on the non-magnetic substrate. In particular, such that the electromagnetic transducing characteristics may be enhanced, the magnetic layer should preferably be constituted of a composition of Co—O, Co—Fe containing Co—O, or the like, in which cobalt constitutes at least 90% of the metal atoms constituting the magnetic layer. In the magnetic layer, cobalt should more preferably constitute at least 95% of the metal atoms constituting the magnetic layer. The thickness of the magnetic layer should preferably fall within the range of 100 nm to 300 nm, and should more preferably fall within the range of 120 nm to 200 nm.

Such that the electromagnetic transducing characteristics may be enhanced even further, the thin ferromagnetic metal film may be constituted of a plurality of layers. Further, the magnetic recording medium may be provided with a non-magnetic primary layer or an intermediate layer.

The magnetic recording medium in accordance with the present invention may also be provided with a protective layer on the thin ferromagnetic metal film. By the provision of the protective layer, the durability against the movement operation and the corrosion resistance can be enhanced even further.

The protective layer may be constituted of an oxide, such as silica, alumina, titania, zirconia, cobalt oxide, or nickel oxide; a nitride, such as titanium nitride, silicon nitride, or boron nitride; a carbide, such as silicon carbide, chromium carbide, or boron carbide; or a carbon, such as graphite or amorphous carbon.

The carbon protective layer may be formed with a plasma-enhanced chemical vapor deposition (plasma-enhanced CVD) process, the sputtering process, or the like, and may have an amorphous structure, a graphite structure, a diamond structure, or a mixture of them. A hard carbon layer, which is ordinarily referred to as the diamond-like carbon layer, is particularly preferable. The hard carbon layer has a Vickers hardness of at least 1,000 kg/mm, and should preferably have a Vickers hardness of at least 2,000 kg/mm. The hard carbon layer has an amorphous crystal structure and is not electrically conductive. With a Raman spectroscopic analysis, the presence of the diamond-like carbon structure in the carbon layer can be confirmed by the detection of a peak at 1,520 cm$^{-1}$ to 1,560 cm$_{-1}$. If the structure of the carbon layer deviates from the diamond-like structure, the peak detected with the Raman spectroscopic analysis will shift from the aforesaid range, and the hardness of the carbon layer will become low.

The hard carbon protective film can also be formed with the plasma-enhanced CVD process from a carbon-containing compound, e.g. an alkane, such as methane, ethane, propane, or butane; an alkene, such as ethylene or propylene; or an alkyne, such as acetylene. The hard carbon protective film can further be formed with the sputtering process by using carbon as the target in a hydrogen atmosphere or a hydrocarbon atmosphere.

If the thickness of the hard carbon protective film is very large, the electromagnetic transducing characteristics will become bad, or the adhesion properties with respect to the magnetic layer will become bad. Also, if the thickness of the hard carbon protective film is very small, the wear resistance will become insufficient. Therefore, the thickness of the hard carbon protective film should preferably fall within the range of 2.5 nm to 20 nm, and should more preferably fall within the range of 5 nm to 10 nm.

Such that the adhesion between the hard carbon protective film and a lubricating agent applied onto it may be enhanced, the surface of the hard carbon protective film may be treated with an oxidizing gas or an inert gas.

In order for the durability against the movement operation and the corrosion resistance of the magnetic recording medium in accordance with the present invention may be enhanced, a lubricating agent or a rust preventive agent should preferably be applied onto the magnetic layer or the protective layer.

As the lubricating agents, known hydrocarbon types of lubricating agents, known fluorine types of lubricating agents, known extreme pressure additives, and the like, may be employed.

Examples of the hydrocarbon types of lubricating agents include carboxylic acids, such as stearic acid and oleic acid; esters, such as butyl stearate; sulfonic acids, such as octadecylsulfonic acid; phosphoric esters, such as monooctadecyl phosphate; alcohols, such as stearyl alcohol and oleyl alcohol; carboxylic acid amides, such as stearic acid amide; and amines, such as stearylamine.

Examples of the fluorine types of lubricating agents include the lubricating agents, in which the alkyl groups in each of the above-enumerated hydrocarbon types of lubricating agents are substituted in whole or in part by fluoroalkyl groups or perfluoro polyether groups. Examples of the perfluoro polyether groups include perfluoromethylene oxide polymer groups, perfluoroethylene oxide polymer groups, perfluoro-n-propylene oxide polymer groups $\{(CF_2CF_2CF_2O)_n\}$, perfluoroisopropylene oxide polymer groups $\{(CF(CF_3)CF_2O)_n\}$, and the groups of copolymers of the above-enumerated oxides.

Examples of the extreme pressure additives include phosphoric esters, such as trilauryl phosphate; phosphites, such as trilauryl phosphite; thiophosphites, such as trilauryl trithiophosphite; thiophosphoric esters; and sulfur types of extreme pressure additives, such as dibenzyl disulfide.

The above-enumerated lubricating agents may be used alone, or two or more of them may be used in combination. In order for the lubricating agent to be applied onto the magnetic layer or the protective film, the lubricating agent may be dissolved in an organic solvent, and the resulting solution may be coated on the magnetic layer or the protective film with a technique, such as wire bar coating, gravure coating, spin coating, or dip coating. Alternatively, the lubricating agent may be applied to the magnetic layer or the protective film with a vacuum evaporation process.

The coating weight of the lubricating agent should preferably fall within the range of 1 mg/m$^2$ to 30 mg/m$^2$, and should more preferably fall within the range of 2 mg/m$^2$ to 20 mg/m$^2$.

Examples of the anticorrosive agents, which may be used for the magnetic recording medium in accordance with the present invention, include nitrogen-containing heterocyclic compounds, such as benzotriazole, benzimidazole, purine, and pyrimidine; derivatives obtained by introducing alkyl side chains into the nuclei of the above-enumerated nitrogen-containing heterocyclic compounds; heterocyclic compounds containing nitrogen and sulfur, such as benzothiazole, 2-mercaptobenzothiazole, tetraazaindene ring compounds, and thiouracil compounds; and derivatives of the above-enumerated heterocyclic compounds containing nitrogen and sulfur.

Examples of the tetraazaindene ring compounds capable of being used for the aforesaid purposes include the compounds which may be represented by the formula

(3)

wherein R represents a hydrocarbon group selected from the group consisting of an alkyl group, an alkoxy group, and an alkyl amide group.

The hydrocarbon group represented by R in Chemical Formula (3) should preferably have 3 to 20 carbon atoms. Examples of the alkoxy groups include R'OCOCH$_2$—, in which R' represents C$_3$H$_7$—, C$_6$H$_{13}$—, or phenyl. Examples of the alkyl groups include C$_6$H$_{13}$—, C$_9$H$_{19}$—, and C$_{17}$H$_{35}$—. Examples of the alkyl amide groups include R"NHCOCH$_2$—, in which R" represents phenyl or C$_3$H$_7$—.

Examples of the thiouracil ring compounds include the compounds which may be represented by the formula

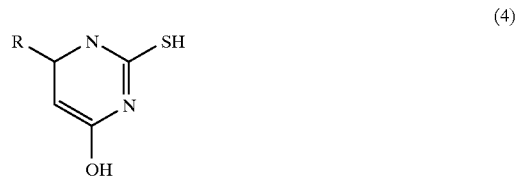

(4)

EXAMPLES

The present invention will further be illustrated by the following nonlimitative examples.

Example 1

A composition containing 3-glycidoxypropyltrimethoxysilane, aluminum acetylacetonate, hydrochloric acid, and water in ethanol was employed as a coating composition. The coating composition was applied with a gravure coating process onto a substrate, which was constituted of a polyethylene naphthalate film having a thickness of 90 μm and the maximum protrusion roughness of 0.01 μm. Thereafter, the coating layer was dried at a temperature of 100° C., and a prime-coating layer having a thickness of 1 μm was thereby formed on the substrate. The coating layer was then heated at 170° C. for one hour, and hardening and solvent removing treatment were there by carried out. After the thus obtained film was heated at 150° C., a Cr—Ti primary layer having a thickness of 60 nm was formed on the prime-coating layer with a DC magnetron sputtering process, and a Co—Cr—Pt magnetic layer having a thickness of 30 nm was subsequently formed on the primary layer. Further, a hard carbon protective layer having a thickness of 20 nm was formed on the magnetic layer with a plasma-enhanced CVD process by using methane as the raw material. There after, a solution containing a perfluoro polyether type of lubricating agent (Fomblin Z-DOL supplied by Audimont Co.) in a fluorine type of solvent (FC-77 supplied by Sumitomo 3M Ltd.) was coated onto the protective layer with a dip coating process, and a lubricating layer having a thickness of 2 nm was thereby formed. The primary layer, the magnetic layer, the protective layer, and the lubricating layer were formed on each of the opposite surfaces of the film. The thus obtained web was punched into a 3.7-inch magnetic disk shape, and a sample of a floppy disk was thereby prepared.

Example 2

A sample was prepared in the same manner as that in Example 1, except that a composition containing 3-glycidoxypropyltrimethoxysilane, methyltriethoxysilane (weight ratio between the two silanes=1:1), aluminum acetylacetonate, hydrochloric acid, and water in ethanol was employed as the coating composition.

Example 3

A sample was prepared in the same manner as that in Example 1, except that a composition containing 3-glycidoxypropyltrimethoxysilane, an organo-silica sol having a grain diameter of 25 nm in ethanol (solid content weight ratio of the silane to the sol=1:1), aluminum acetylacetonate, hydrochloric acid, and water in ethanol was employed as the coating composition.

Example 4

A sample was prepared in the same manner as that in Example 1, except that a composition containing 3-glycidoxypropyltrimethoxysilane, methyltriethoxysilane, an organo-silica sol having a grain diameter of 25 nm in ethanol (solid content weight ratio among the silanes and the sol=1:1:1), aluminum acetylacetonate, hydrochloric acid, and water in ethanol was employed as the coating composition.

Example 5

A sample was prepared in the same manner as that in Example 1, except that a composition containing 3-glycidoxypropyltrimethoxysilane, zirconium acetylacetonate, hydrochloric acid, and water in ethanol was employed as the coating composition.

Example 6

A sample was prepared in the same manner as that in Example 1, except that a composition containing 3-glycidoxypropylmethyldimethoxysilane, methyltriethoxysilane (weight ratio between the two silanes =1:1), aluminum acetylacetonate, hydrochloric acid, and water in ethanol was employed as the coating composition.

Comparative Example 1

A sample was prepared in the same manner as that in Example 1, except that the prime-coating layer was not formed, and the magnetic layer was formed directly on the polyethylene naphthalate film.

Comparative Example 2

A sample was prepared in the same manner as that in Example 1, except that a composition containing 3-glycidoxypropylmethyldimethoxysilane, hydrochloric acid, and water in ethanol was employed as the coating composition.

Comparative Example 3

A sample was prepared in the same manner as that in Example 1, except that a composition containing tetraethoxysilane, hydrochloric acid, and water in ethanol was employed as the coating composition.

Comparative Example 4

A sample was prepared in the same manner as that in Example 1, except that a composition containing a polyester resin (Vylon 200 supplied by Toyobo Co., Ltd.) in methyl ethyl ketone was employed as the coating composition.

Each of the thus prepared samples was evaluated with respect to the characteristics described below.

1) Surface Characteristics

The surface of the prime-coating layer after being hardened and the surface of the finished medium were observed with an optical microscope (100-power magnification). Also, the range from 10×10 $\mu$m to 100×100 $\mu$m was observed with an interatomic force microscope (AFM). As for30×301 $\mu$m, the distribution of protrusion heights from a reference plane and the number of protrusions having a height of at least 2 nm were investigated.

2) Occurrence of Blocking after Coating and Drying of the Prime-coating Layer

After the film was wound up, the occurrence of blocking to the film back surface (on which the coating layer had been formed) was investigated.

The results shown in Table 1 below were obtained.

TABLE 1

| Sample | Blocking | crack | Medium surface characteristics (optical microscope) Rough state | Medium surface characteristics (AFM) Rough state | Number of protrusions |
|---|---|---|---|---|---|
| Ex. 1 | None | None | None | None | 0 |
| Ex. 2 | None | None | None | None | 0 |
| Ex. 3 | None | None | None | None | 0 |
| Ex. 4 | None | None | None | None | 0 |
| Ex. 5 | None | None | None | None | 0 |
| Ex. 6 | None | None | None | None | 0 |
| Comp.Ex. 1 | None | Cracks | Rough | — | — |
| Comp.Ex. 2 | Occurred | None | Rough | Rough | — |
| Comp.Ex. 3 | None | Cracks | None | — | — |
| Comp.Ex. 4 | None | None | None | Rough | 24 |

What is claimed is:

1. A magnetic recording medium comprising a non-magnetic substrate and a magnetic layer, which is constituted of a thin ferromagnetic metal film and is overlaid upon at least either one of the surfaces of the non-magnetic substrate, wherein a prime-coating layer, which has alkyl chains linked by an ether linkage to each other in a polysiloxane, is formed between the non-magnetic substrate and the thin ferromagnetic metal film.

2. A magnetic recording medium as defined in claim 1 wherein said prime-coating layer contains, as a principal constituent, a polymerization product of a silane coupling agent, which contains an organic residue having an epoxy group.

3. A magnetic recording medium as defined in claim 1 wherein said thin ferromagnetic metal film is formed with a sputtering process.

4. A magnetic recording medium as defined in claim 1 wherein the magnetic recording medium has a disk shape.

5. A process for producing a magnetic recording medium, comprising the steps of:

i) applying a coating composition, which contains a solution of a silane coupling agent, that contains an organic residue having an epoxy group, onto a non-magnetic substrate, and ii) heating the applied coating composition such that the applied coating composition may be dried and such that the silane coupling agent may be polymerized, whereby a prime-coating layer is formed on the non-magnetic substrate.

6. A process as defined in claim 5 wherein said coating composition further contains a hardener.

7. A process as defined in claim 6 wherein said hardener is constituted of a metal chelate compound.

8. A process as defined in claim 5 wherein the solution of said silane coupling agent, that contains the organic residue having an epoxy group, further contains a silane coupling agent, which contains a hydrocarbon group.

* * * * *